Dec. 19, 1961        G. STEINLEIN        3,013,792

DIAPHRAGM SPRING ARRANGEMENT

Filed April 4, 1961        2 Sheets-Sheet 1

INVENTOR
Gustav Steinlein
By Richard Ernst
Agt

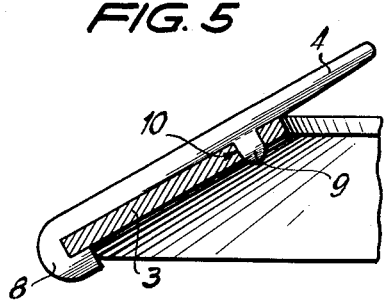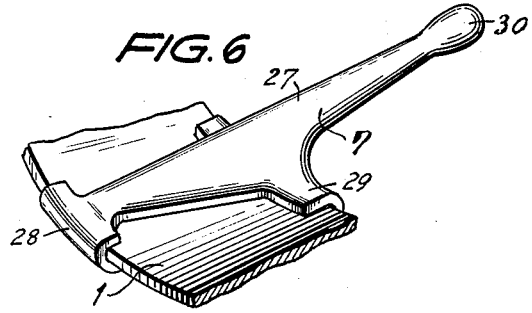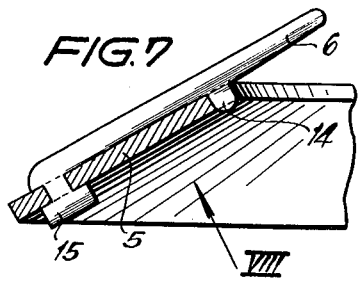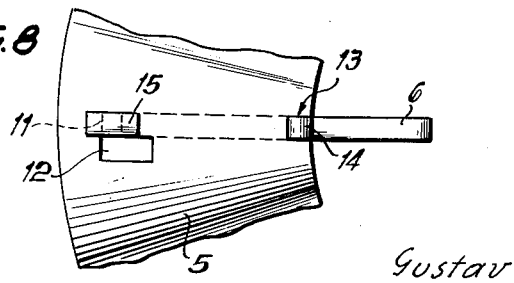

United States Patent Office 3,013,792
Patented Dec. 19, 1961

3,013,792
DIAPHRAGM SPRING ARRANGEMENT
Gustav Steinlein, Forsthaus, Mainberg, near Schweinfurt, Germany, assignor to Fichtel & Sachs A.G., Schweinfurt, Germany, a corporation of Germany
Filed Apr. 4, 1961, Ser. No. 100,757
Claims priority, application Germany Apr. 28, 1960
10 Claims. (Cl. 267—1)

This invention relates to cup or diaphragm springs, and more particularly to diaphragm springs of the type commonly employed as pressure springs in automotive friction clutches and the like.

Cup springs are conventional machine elements. They generally have a very steep characteristic curve, that is, a plot of applied load versus deflection of the spring indicates the need for a sharp increase in the load to produce even a small increase in the deflection. Such a steep characteristic curve is undesirable for many purposes. It is common practice to provide diaphragm springs for automotive clutches and the like with slots which extend radially inward or outward from an edge of the spring member. By providing suitably designed slots one may alter the characteristic curve of the spring over a wide range.

Diaphragm springs having slotted edges are simple devices, yet they cannot be conveniently produced from spring steel or similar metallic material that requires a heat treatment after completion of mechanical shaping operations. The tong shaped portions of the spring between the radial slots tend to warp during the heat treatment, and the characteristics of the spring vary significantly depending on the shape ultimately assumed by the tongs. This shape, however, is not readily controlled or predictable.

It is the primary object of this invention to provide a cup or diaphragm spring arrangement the characteristics of which may be varied over a wide range in a predictable and reproducible manner.

Another object of the invention is the provision of a spring arrangement the characteristics of which may be varied without making any changes in the spring element proper.

Other objects and many of the attendant advantages of this invention will be readily appreciated as the same becomes better understood by reference to the following detailed description when considered in connection with the accompanying drawings wherein:

FIG. 5 is a view of a second embodiment of the invention in an axial fragmentary section corresponding to that of FIG. 4;

FIG. 6 shows a portion of a third embodiment of the invention in a perspective view;

FIG. 7 illustrates a fourth embodiment of the spring arrangement of the invention in an axially sectional view similar to that of FIG. 5; and FIG. 8 shows the spring arrangement of FIG. 7 in a fragmentary bottom view taken in the direction of the arrow VIII.

Figure 1:
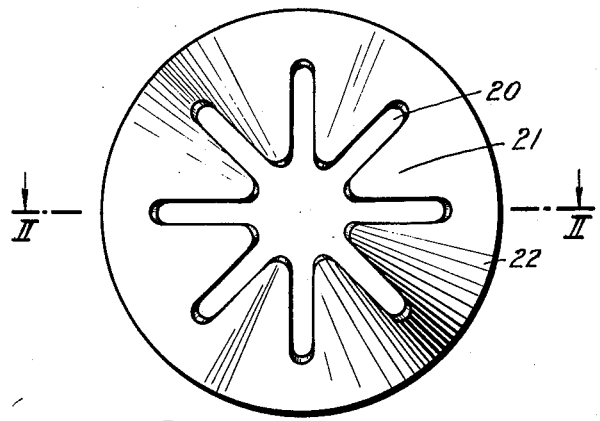
FIG. 1 is a plan view of a conventional diaphragm spring.
Figure 2:
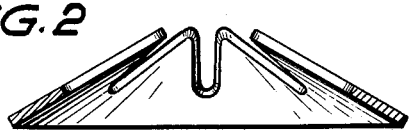
FIG. 2 shows the spring of FIG. 1 in axial section on the line II—II.

Referring now to the drawing in detail, and initially to FIGS. 1 and 2, there is seen a conventional diaphragm spring. It has the approximate shape of the hollow frustum of a cone having eight slots 20 which extend radially outward from the inner edge. Eight tongs 21 of approximately triangular shape are left standing between the radial slots. Their apex portions extend freely in an axially upward and radially inward direction, and their bases are joined to each other and to the annular body 22 of the diaphragm spring. A load is usually applied to such a spring by pressure plates having radially extending faces which are urged against the eight apex portions of the tongs 21 and the annular body 22 respectively in opposite axial direction. Any deviation of one or several tongs 21 from a desired shape influences the spring characteristics. Where the deviation is practically uncontrollable as in a hardening operation involving heat treatment, the precise characteristics of the spring produced are unpredictable.

A spring cup or diaphragm not equipped with slots, and thus not having tong portions which are relatively free to move and to warp during the thermal hardening process has a characteristic curve which is much more readily reproducible though usually too steep.

To combine the desirable spring characteristics of the known slotted diaphragm spring of FIGS. 1 and 2 with the reproducibility of the equally known plain annular cup spring, I propose to provide a spring arrangement consisting of separate elements of which one provides the resilience of the spring, and the other one transmits the applied load to the resilient member in such a manner as to modify the characteristic spring curve of the assembly in the desired manner. Slots and tongs integral with the spring member are thus avoided.

Figure 3:
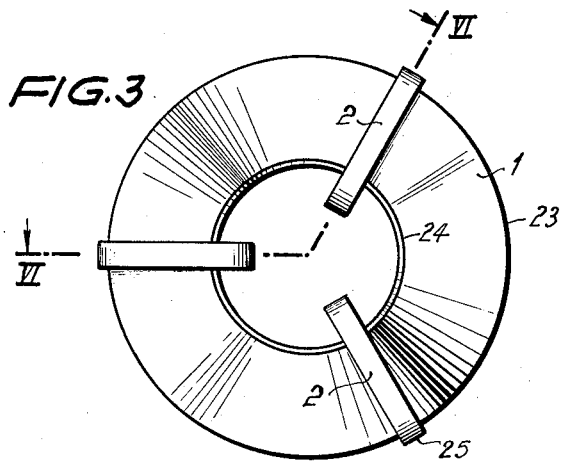
FIG. 3 illustrates a first embodiment of the spring arrangement of the invention in plan view.
Figure 4:
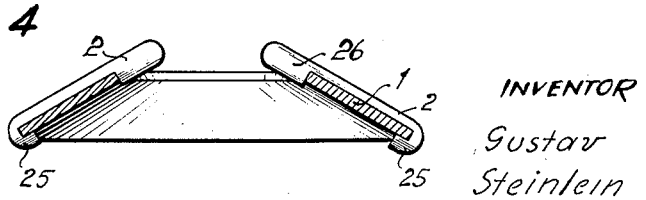
FIG. 4 shows the spring arrangement of FIG. 3 in axial section on the line IV—IV.

In the first embodiment of the invention illustrated in FIGS. 3 and 4 in a plan view and in an axial section respectively, the spring element 1 is a frustoconical hollow disc of spring steel or the like, extending between a full circular outer edge 23 and an equally uninterrupted circular inner edge 24. The disc 1 is produced as a finished hardened unit the shape of which is readily controlled.

Three elongated lever members 2 are circumerentially spaced on the top face of the disc 1. Each lever member is a relatively heavy, rigid rod with rounded ends and has a rectangular cross section. One end 25 of each rod 2 is bent into a hook the bight of which receives the outer edge 23 of the disc 1. The other end 26 of the rod overhangs the inner disc edge 24, and projects over the edge 24 in both a radially inward and an axial direction. The end 26 is of greater cross section than the remainder of the rod 2 so as to form a shoulder against which the inner edge 24 abuts.

When pressure is applied axially against the outer edge 23 of the spring disc 1 or the outer ends 25 of the rods 2, and against the inner ends 25 of the rods 2, the rods are pivoted about the inner disc edge 24, and the disc 1 is correspondingly deflected. The number of lever members 2 provided for a given spring disc 1 and the length of the overhanging end portion 26 determines the spring characteristics of the assembly which may therefore be varied without changing the disc 1. Identical discs may provide the resilient members for widely varying spring arrangements.

The embodiment of the invention partially illustrated in FIG. 5 in axial section has a disc 3 bounded by uninterrupted circular edges but provided with as many perforations 10 as there are lever members 4, only one perforation and one lever member being visible in the drawing. The perforations 10 extend through the disc 3 near its inner edge and receive a corresponding lug 9 on the lever member 4. The engagement of the lug 9 with the perforation 10 provides a pivot for the lever 4. The inner end of the lever 4 projects radially inward and axially beyond the inner edge of the disc 3, and the outer end 8 forms a hook which envelopes the outer edge of the disc 3 in the same manner as described in connection with the embodiment of the invention shown in FIGS. 3 and 4.

The apparatus illustrated in FIG. 5 more precisely defines the circumferential position of the several lever members 4, and thus permits simple assembly of precisely identical spring arrangements.

The embodiment of the invention shown in FIG. 6 in a perspective view has a plurality of lever members 7, of which one only is seen. They are assembled with the disc 1 of FIGS. 3 and 4. The lever member 7 is press-formed from heavy sheet metal. The desired rigidity under an applied load is achieved by curving the elongated body portion 27 of the lever member 7 in an arc about the direction of elongation of the member. An end flap 28 and two side flaps 29 are respectively bent over the outer and inner edges of the disc 1 to clamp the lever member 7 to the disc. The inner end of the lever member 7 is formed into an ellipsoidally shaped button 30 which engages the cooperating face of a pressure member with a minimum of friction.

In the embodiment of the invention illustrated in FIGS. 7 and 8, the frustoconical spring disc 5 cooperates with a plurality of levers 6 in the manner evident from the aforedescribed embodiments of the diaphragm spring arrangement of the invention. The manner in which two longitudinally spaced portions of the lever 6 are secured to two radially spaced edge portions of the disc 5 is different though from the other examples illustrated and described above.

The inner edge of the disc 5 has as many shallow open notches 13 as there are levers 6, and each notch is engaged by a corresponding lug 14 of a lever. The outer end of the lever 6 has a laterally projecting latch 15 which has the shape of a letter T. The free end of the stem of the T is attached to the lever 6 proper, and the spacing between the cross bar of the T and the lever 6 is only slightly greater than the thickness of the disc 5. A radially elongated slot 12 and a short circumferential extension 11 of the slot 12 which is radially aligned with each notch 13 are cut into the disc 5. The slot 12 is dimensioned to permit passage of the cross bar portion of the latch 15, and the cross section of the extension slot 11 conforms to that of the stem of the latch 15.

To assemble the spring arrangement shown in FIGS. 7 and 8, one inserts the inserts 15 in the slot 12 until the cross bar clears the slot and the lever 6 may be rotated about the slot 12. The lug 14 is then aligned with the notch 13 and slipped into the same while the stem of the latch 15 is simultaneously introduced into the extension slot 11. The lever 6 is then secured on the disc 5 to transmit pressure to the same. The free end of the lever 6 which overhangs the disc 5 in an inwardly radial direction is rounded off to provide a contact face of arcuate cross section, and thus of low frictional resistance for a pressure plate and the like which exerts forces on the levers 6.

Obviously many modifications and variations of the present invention are possible in the light of the above teachings. The method of fastening the levers to the annular spring member may be varied widely as will be readily apparent to those skilled in the art. Instead of overhanging the inner edge of the annular spring disc, the lever members may overhang the outer edge or both edges. They may be permanently attached as is shown, for example, in FIG. 6, or they may be releasably mounted as illustrated in FIGS. 3 to 5, 7, and 8.

It will be understood that the foregoing disclosure relates to preferred embodiments of the invention, and that it is intended to cover all changes and modifications of the example of the invention herein chosen for the purpose of the disclosure which do not constitute departures from the spirit and scope of the invention set forth in the appended claims.

What I claim is:

1. In a diaphragm spring arrangement, in combination; an annular disc member having a radially extending disc face and two radially spaced edge portions; and a lever member elongated in a radial direction, two longitudinally spaced portions of said lever member being respectively secured to said edge portions against movement in an axial direction, and a terminal portion of said lever member radially overhanging one of said edge portions.

2. In an arrangement as set forth in claim 1, said one edge portion being spaced radially inward from the other edge portion.

3. In an arrangement as set forth in claim 1, said portions of said lever member being releasably secured to said edge portions.

4. In an arrangement as set forth in claim 1, said disc member consisting essentially of a resilient material, and said lever member being less resilient than said disc member.

5. In an arrangement as set forth in claim 1, one of said longitudinally spaced portions of said lever member being the other terminal portion thereof, said other portion being hook-shaped, and one of said edge portions being received in the bight of said hook-shaped terminal lever portion.

6. In an arrangement as set forth in claim 1, said terminal portion of said lever having a contact face of arcuate cross section.

7. In a spring arrangement, in combination, a resilient annular disc member having a radially extending disc face and two radially spaced edge portions; and a plurality of substantially rigid circumferentially spaced lever members, each one of said lever members being elongated in a radial direction, two longitudinally spaced portions of said one lever member being respectively secured to said edge portions against movement in an axial direction, and a terminal portion of said one lever member radially overhanging one of said edge portions.

8. In an arrangement as set forth in claim 7, said lever members being substantially symmetrically spaced about the circumference of said disc face.

9. In a spring arrangement, in combination, a resilient annular disc member having substantially the shape of the hollow frustum of a cone; and a substantially rigid lever member having respective portions secured to two radially spaced portions of said disc member, a terminal portion of said lever member radially overhanging said disc member.

10. In an arrangement as set forth in claim 9, said terminal portion overhanging said disc member in a radially inward direction.

References Cited in the file of this patent

UNITED STATES PATENTS

| | | |
|---|---|---|
| 1,988,345 | Vaughn | Jan. 15, 1935 |
| 2,571,170 | Stilwell | Oct. 16, 1951 |
| 2,882,678 | Crownover | Apr. 21, 1959 |